Jan. 15, 1952   H. L. CROWLEY ET AL   2,582,922
APPARATUS FOR MOLDING ARTICLES
Filed May 27, 1949
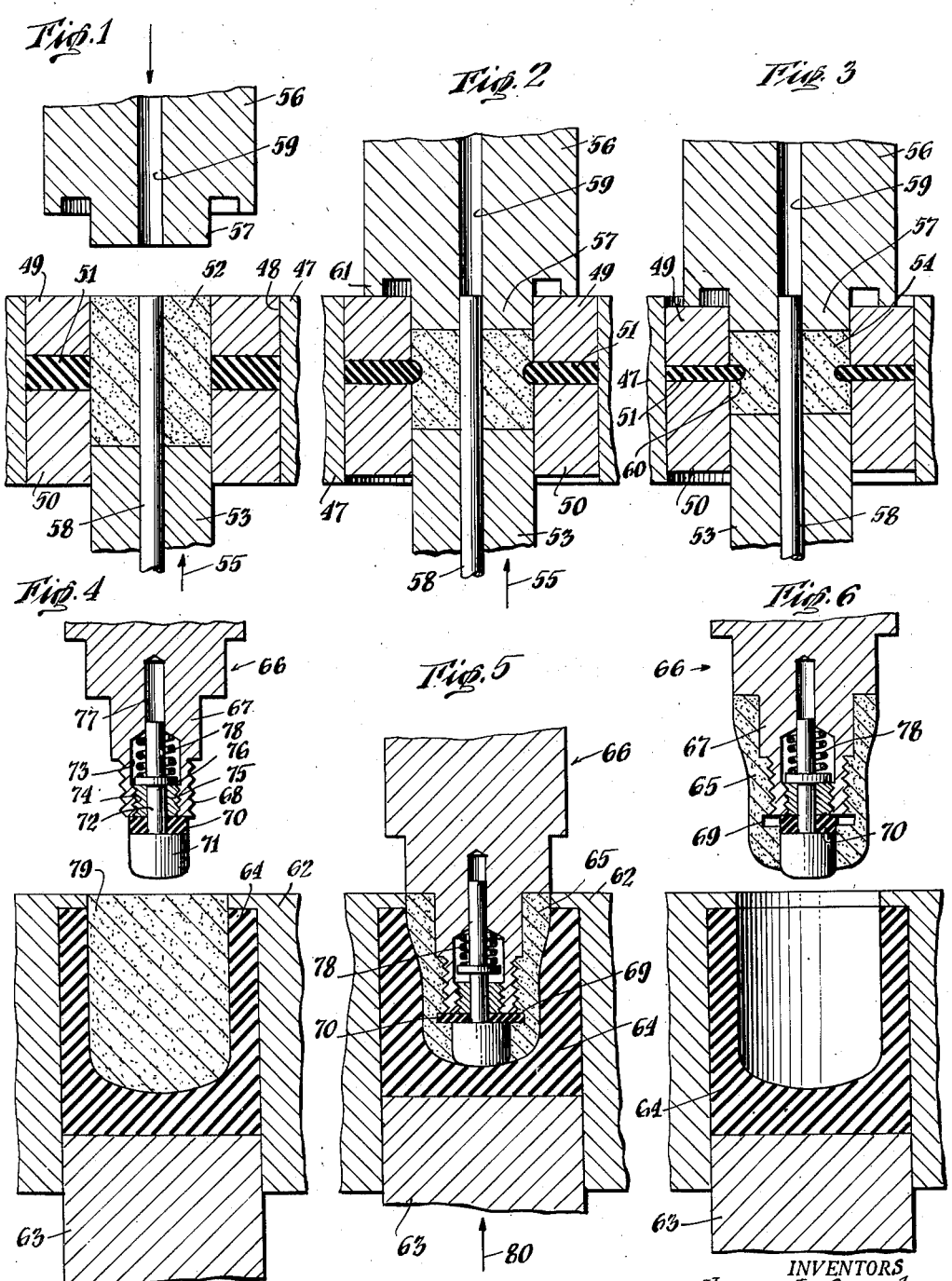
INVENTORS
Henry L. Crowley
BY Arthur M. Hossenlopp
Robert S. Dunham
ATTORNEY Patented Jan. 15, 1952

2,582,922

UNITED STATES PATENT OFFICE 2,582,922

APPARATUS FOR MOLDING ARTICLES

Henry L. Crowley, South Orange, and Arthur M. Hossenlopp, Maplewood, N. J., assignors to Henry L. Crowley & Company, Inc., West Orange, N. J., a corporation of New Jersey Application May 27, 1949, Serial No. 95,804

1 Claim. (Cl. 18—34)

This invention relates to apparatus for molding articles and more particularly to apparatus for molding articles from moldable materials wherein at least a part of the molding means, i. e. a die means, or the like, is formed of a yieldable material, which may flow under pressure and within its elastic limit to change the form of the mold cavity.

The term "moldable material" as used herein to define the material used in forming the products being made is intended to be interpreted in a broad sense to include not only material which will flow under pressure, such as a plastic clay mass having about 50% clay and 20%–25% water, but also materials which may be formed or molded by the application of pressure thereto, but which do not flow under pressure. Such non-flowing materials include many of the powdered metals. As such, this term is intended to include any type of unformed or amorphous material which may be molded by press molding methods, such materials including ceramic materials with more or less water or other liquids mixed therewith, organic plastic molding compositions such as are well known in the art, powdered metals or mixtures thereof, or materials including substantial proportions of one or more powdered metals and other materials or mixtures which lend themselves to molding by recognized press forming methods and which may be molded by apparatus as herein disclosed in accordance with the teachings hereinafter particularly set forth. It will be understood, of course, that some of these materials may require the maintenance of certain temperatures during the molding operations. In such an event, it will be understood that any suitable temperature controlling means may be employed for providing the necessary temperature and temperature control. Such means, if used, however, form no part of the present invention and will not be further referred to herein.

The invention particularly relates to the provision of a part of similar yieldable material for forming a reentrant cavity on or in an article being formed, so as to provide for the making of articles in a better manner than could be done with conventional molding means. The invention further relates to the making of articles having one or more reentrant cavities therein, which are so arranged and disposed that the formed articles could not be removed from the molding apparatus without first retracting the portion of the molding apparatus used in forming such cavity or cavities. In such case the retractable portion of the molding apparatus is similarly made from a yieldable material which has the characteristics of flow within its elastic limit so as to be movable into and retractable from a cavity as aforesaid. A preferred yieldable and flowable material for use in accordance with this invention is rubber or a rubber-like composition.

Among the objects of the present invention is to provide for the forming of articles in molds including a part at least of a yieldable material, such as rubber or a rubber-like composition, in which provision is made for the flow under pressure of the yieldable material incident solely to axial pressure applied in press-forming the articles, the axial pressure being applied solely on a single pressure axis, so as to avoid the requirement heretofore found necessary for supplying of lateral pressure by fluid pressure means or otherwise to cause movement of a flexible mold part during the forming or molding operation.

A principal object of the invention is to provide for the making of articles which have cavities therein of such shape and disposition that the formed articles could not be removed or stripped from the molding apparatus without first retracting the portion of the molding apparatus used in forming such cavity or cavities. In achieving this object, the invention contemplates the forming of such cavity or cavities by means of a rubber or rubber-like mold portion, which has the characteristics of flow within its elastic limit when subjected to molding pressure and which is so arranged and confined that the flow is directed to moving a part of this rubber or rubber-like material into the space to be formed as a cavity in the molded article as aforesaid. For example, in this way it is possible to form annular grooves either extending from an outside surface inwardly or extending from an inner depression outwardly in an article. In accordance with the present invention the rubber or rubber-like material returns to its initial form upon the release of pressure due to the fact that the flow thereof was within the elastic limit of the material and due to the inherent elasticity of the material itself, so as to permit normal removal or stripping of the article formed as aforesaid from the molding means.

A further object of the present invention is to provide for the forming of articles having reentrant cavities as aforesaid, wherein the rubber or rubber-like material is confined between two relatively movable parts, each of substantially non-yielding material, and which parts are arranged for movement toward one another during the molding operation to compress the rubber or rubber-like material therebetween, all incident to the application of molding pressure along a single pressure axis.

Other and more detailed objects of the present inventtion will become apparent from the following specific description of practical embodiments of the invention and will be pointed out in the appended claims, all when considered in conjunction with the accompanying drawings, in which:

Fig. 1 is a view substantially in central vertical section of molding apparatus for the forming of an article having a reentrant annular groove in the outer surface thereof, the parts being shown in the position they occupy when the mold is filled with moldable material, but prior to the movement together of the molding parts;

Fig. 2 is a similar view of the apparatus shown in Fig. 1, with the parts in the position they occupy intermediate the ends of the press-molding operation, after the moldable material has been partly compressed and the annular groove partly formed therein;

Fig. 3 is a similar view of the parts shown in Figs. 1 and 2 at the end of the press molding operation, but prior to the movement apart of the several parts and the retraction by the relief of compression of the yieldable mold forming material used in forming the annular groove;

Fig. 4 is a similar view of a further modification of the invention shown in Figs. 1 to 3, used for the forming of an article having a cavity therein and having a reentrant groove communicating with the cavity and extending outwardly therefrom into the formed article, the parts being shown in central vertical section prior to the movement together of the molding parts;

Fig. 5 is a similar view of the apparatus of Fig. 4 with the parts thereof in the positions they occupy at the end of the press forming operation; and Fig. 6 is a similar view of the apparatus shown in Figs. 4 and 5, with the parts in the position they occupy following the removal of the formed article from the mold proper, but prior to the stripping of the article from the pressing plunger means.

The forms of the invention shown in the accompanying drawings relate to the making of a molded article from moldable material of any desired and suitable kind as aforesaid, wherein the molded article includes a reentrant cavity which is so arranged and disposed that the formed article cannot be removed from the molding apparatus without first retracting the portion of the molding apparatus used in forming such cavity.

In the past articles of this kind have been made in either one of two ways; first, by forming the article complete without the cavity and later cutting or somehow forming the cavity therein by a separate machining operation, for example, by turning in a lathe where the material is sufficiently soft, or by grinding, etc. A second way in which the prior art has made such articles is by forming mechanically retractable mold portions of relatively hard, inflexible material, which are physically moved into a position to form the desired reentrant cavity at or before the molding operation commences, so that the moldable material is formed around the projecting mold part or parts and thereafter such projecting part or parts are physically retracted by a mechanical operation to permit the removal of the article from the mold. Similarly, flexible sheet-like elements of rubber have been moved laterally in a mold by the application of fluid pressure to the rear side thereof so as to distend them before or during the molding operation, following which the fluid pressure is relieved, permitting the rubber section to be retracted to its initial out-of-the-way position, so as to permit removal of the article from the mold.

All these schemes have involved much more complicated mechanism than is required in accordance with the present invention and have also, to some extent at least, been subject to objection by reason of their irregular operation, as it is not certain, for example, how deep a cavity is to be when it is made by a flexible rubber section with fluid pressure behind it, in view of the possible non-uniformity or imperfect flow characteristics of the moldable material during the molding thereof.

The present application secures uniform desirable results of this character with much simpler mechanism and/or with more certainty in the results obtained. This is accomplished basically by the mechanical application of pressure to a body of flexible and yieldable material of rubber or rubber-like composition, so as to cause it to flow within its elastic limit in a manner such as to form the desired reentrant cavity or cavities. There is shown in the accompanying drawings arrangements by which a reentrant groove such as an annular groove may be formed in the outside of a body being molded and also an arrangement by which a similar but reverse reentrant groove may be formed in the inside cavity of a hollow or substantially hollow article, the groove opening to the cavity and extending outwardly therefrom into the article. It will be understood that similar methods and means may be employed to form non-continuous grooves or suitably shaped depressions in one side only, for example, of an article being formed.

In Figs. 1 to 3 of the accompanying drawings, there is shown an arrangement by which a molded article can be formed, for example, in the form of a hollow cylinder having an external annular groove substantially midway between the ends thereof and parallel to the periphery of each end. As shown, in Fig. 1, an outer mold part 47 may be formed with a substantially cylindrical or otherwise suitably shaped aperture 48 therein, in which are freely slidable upper and lower mold parts 49 and 50. It will be understood that the outer contour of the mold parts 49 and 50 are such as to be freely slidable in a solely vertical direction as shown in the aperture 48. Disposed between the mold parts 49 and 50 is a body of rubber or rubber-like composition 51, which has the same outer periphery as the mold parts 49 and 50 and which in an unstrained condition, i. e. when no pressure is effective thereon, has an inside opening having a configuration and size the same as or slightly greater than the mold parts 49 and 50. Thus the insides of the mold parts 49, 50 and 51 jointly define a mold cavity for the reception of moldable material here indicated at 52. It will be understood that the mold part 50 will be suitably supported by means not shown to prevent its downward movement from the position shown, and if desired may be provided with means by which it may be moved upwardly from the Fig. 1 position to the positions of Fig. 2 or 3, such means being optional.

Associated with the mold parts above described in this form of the invention is a bottom mold closure means 53 effective initially to define the space to be filled with the unformed and substantially amorphous moldable material 52 and effective thereafter during the pressing operation to move upwardly as is shown by comparison of Figs. 1 to 3 to assist in compressing the material 52 from the loose form thereof shown in Fig. 1 to the final desired shape shown at 54 in Fig. 3. To this end the bottom closure means 53 will be provided with suitable means (not shown) associated therewith by which it may be positively or resiliently moved in the direction indicated by the arrow 55, Figs. 1 and 2.

For compressing the unformed material within the mold thus formed, there is provided a pressing plunger here generally indicated at 56. This plunger has a pressing portion 57 of suitable size to enter into the cavity in the mold part 49 as shown, i. e. so as to be freely, slidably received within the aperture forming the upper part of the mold cavity. To complete the forming of the desired article, and neglecting for the moment the annular groove to be formed therein, there is provided a core member 58 extending through the bottom mold part 53, this core member being arranged to telescope within a suitable hole 59 in the pressing plunger 56 as shown by a comparison of Figs. 1 to 3.

In the form of the invention shown in these figures, it is desired to provide an annular groove extending inwardly from the outer periphery of the article to be formed substantially midway of its height. For this purpose, in accordance with the present invention, the rubber-like composition body 51 is provided intermediate the mold parts 49 and 50. When these parts are moved toward one another, during the time molding pressure is being applied, or before that if desired, the rubber-like material of the body 51 is caused to flow from the form shown in Fig. 1 to the form shown in Fig. 3, so as to extend into the mold cavity to form a groove in the final molded article as indicated at 60. This action takes place due to the fact that the rubber-like material of the body 51 is confined on its outside periphery by the outer mold part 47. As a result, when the mold parts 49 and 50 are moved together, i. e. toward one another, the rubber-like composition can flow in only one direction, i. e. radially inwardly. Due to the physical characteristics of this material or composition, the amount of flow is accurately determinable by the amount of movement together of the mold parts 49 and 50. This in turn can be mechanically determined by the amount of pressure applied and by suitable mechanical limiting means or stops (not shown). Thus the depth of the groove to be formed may be positively and accurately determined, which is impossible when operating in accordance with many at least of the prior art devices. It is essential to the present invention, however, that the flow caused as aforesaid be kept within the elastic limit of the material of the body 51.

It is usually desired that but a single source of power be used for compressing the moldable material 52 to the final desired form shown at 54 in Fig. 3; but it is contemplated, however, that if desired some separate power source could be used for effecting the relative movement, toward one another, of the parts 49 and 50. The present invention is to be considered as including such a modification. However, when using a single source of power only, such as is available in standard commercial pressing apparatus, this source of power is usually provided to apply pressure on a single axis only, usually a vertical axis. For this reason, the pressing plunger means 56 is shown provided with an axially extending peripheral flange 61, which is effective to bear upon the mold part 49 at a predetermined time after the pressing portion 57 has entered the mold cavity and partly compressed the material therein. This condition is shown substantially in Fig. 2. If then the mold part 50 is either prevented from moving downwardly, or is positively moved upwardly by suitable means associated with the pressing apparatus, the rubber-like body 51 may be suitably compressed as aforesaid to form the desired annular groove.

Inasmuch as the rubber composition body is caused to flow only within its elastic limit, upon relief of the pressure applied thereto, it will return to its initial or normal state as shown in Fig. 1, thus permitting the removal of the completed article without interference from the groove forming portion, i. e. the body 51.

In Figs. 4 to 6 there is shown an arrangement by which an annular groove may be formed extending laterally outwardly from a central recess or cavity of a substantially hollow body, this formation taking place during the molding of the body as a whole.

There is shown in these figures of the drawings a means which is or may be conventional for forming the outer configuration of the hollow body. Such means in the present instance may include a solid or non-yieldable mold or may include as particularly illustrated a resilient mold as a rubber composition body contained within non-yielding mold parts. In this form of the invention, however, the use of a rubber composition mold as shown is not intended as per se forming a part of the present invention, but is merely shown incidentally.

As shown, there is provided an outer mold member 62 having a separate and independently movable bottom member 63 associated therewith which may initially occupy the position shown in Fig. 4 and thereafter be moved to the Fig. 5 position. Contained within the mold member 62 and above the member 63 is a body 64 of rubber or a rubber-like composition, which is used to impart the final desired exterior shape to the object to be made, this shape being shown at 65, in Figs. 5 and 6.

Associated with the mold parts thus far described for this form of the invention is a pressing plunger apparatus generally designated at 66. As shown, this plunger apparatus has relatively large diameter portion 67 for forming a large diameter entrance portion for the internal cavity for the final article and has a somewhat smaller diameter portion 68 next below the portion 67. In this case the portion 68 is shown threaded, so that while the moldable material may be formed around the threaded portion and molded by a pressing operation as illustrated and more particularly hereinafter described, the final stripping of the completed article from the plunger must be done by a relative unscrewing operation. Such operations are now conventional in forming molded articles having threaded parts, for example the glass insulators used on outside telegraph poles. This forming of a threaded hole or hollow space and the unscrewing operation for stripping the final article from the plunger is not a necessary part of the present invention and is shown merely incidentally. Any suitable means (not shown) may be provided for effecting this purpose.

The present invention is particularly concerned with means for forming an annular groove as shown at 69 which opens to the internal cavity formed in the final body and extends outwardly therefrom into the molded material. It is difficult, if not impossible, to form such a groove during the molding operation in accordance with prior practices, it being conventional in the forming of such shaped articles to cut the groove by mechanical means following the completion of the molding operation. The present invention enables such a groove to be formed during and as a part of the molding operation itself.

In order to provide for molding a groove as aforesaid, recourse is again had to a body of rubber or rubber-like composition shown at 70, here shown as in the form of an annular disc and disposed between a head 71 and parts of or integral or rigid with the pressing plunger 66. When, during the molding operation, the head 71 is moved toward the relatively rigid parts of the pressing plunger, i. e. upwardly in respect to the parts 67—68, the rubber-like body 70 is compressed. As this compression proceeds, and as the yieldable material can not expand radially inwardly due to a stem 72 of the head 70 extending therethrough, the yieldable rubber-like material of the body 70 must expand outwardly from the shape or position of the parts shown in Fig. 4 to that shown in Fig. 5, thus forming the desired groove 69. This operation of compressing the rubber-like composition to cause it to flow, always within its elastic limit, is effective incident to the principal pressing operation, in this case by the head 71 setting or substantially setting upon the bottom portion of the mold cavity as shown in Fig. 5, whereupon continued downward movement of the pressing plunger 66 by suitable means (not shown) causes a relative movement together of the pressing plunger proper and the head 71, forcing portions of the rubber-like material outwardly as shown.

In order that the parts may be suitably retained together, assembled and disassembled, the end portion of the pressing plunger is provided with an internal cavity or bore 73, the lower end of which is provided with inwardly directed threads 74 into which is screwed an annular threaded plug 75, which is sleeved around the stem 72 of the head 71 above the body 70. Suitably secured to the stem 72 above the plug 75 is a washer or detent 76 for preventing accidental dislocation of the parts. The stem 72 may further be guided in a suitable counterbore 77 formed in axial prolongation of the bore or cavity 73. If desired, a suitable light compression spring 78 may be interposed between the upper side of the washer or detent 76 and the inner end of the cavity 73 in order to urge the parts to their normal position shown in Figs. 4 and 6.

The operation of this form of the invention should now be apparent from the foregoing description. With the mold parts in the position shown in Fig. 4, moldable material is supplied as indicated at 79 to the mold cavity in the body 64. The plunger means 66 is then moved downwardly by suitable means (not shown), while at the same time the bottom member 63 is moved upwardly by other means (not shown, but indicated diagrammatically by the arrow 80, Fig. 5), to move the parts to the position shown in Fig. 5. This movement results in the applying of suitable pressures to the rubber-like part 64, so as to shape the outside of the article to be formed in a desired manner. At the same time, the inside or hollow portion of the article is formed by the extended parts of the plunger apparatus 66; and relative movement of the plunger head 71 and the remainder of the plunger is effective to compress the rubber-like body 70 to form the groove 69. Upon relief of pressure effective on the plunger 66 and bottom member 63, the parts may be separated to the position shown in Fig. 6. At this position, pressure effective on the rubber-like body 70 has been relieved, so as to permit this body to return to its normal position, retracting it from engagement with the undercut annular recess 69. This action is assisted by the expansion of the spring 78. Following this, the article 65 may be removed from the plunger head by any suitable unscrewing operation, manual or otherwise.

While there has been shown and described several modifications of the present invention, illustrating how the principles thereof may be applied in different ways, we do not wish to be limited except by the scope of the appended claims, which are to be construed validly, as broadly as the state of the prior art permits.

What is claimed is:

Apparatus for molding articles of unformed moldable material to a predetermined size and shape, said shape including a cavity such as may be formed by a pressing plunger and the plunger withdrawn therefrom, plus an annular reentrant cavity communicating with and extending outwardly from the first named cavity, said cavities being of such form that the means by which they are formed in a molded article can not be removed therefrom without first retracting that portion of the forming means used in forming said reentrant cavity, said apparatus comprising means providing a mold cavity in which the articles are to be formed, and a pressing plunger assembly cooperating with the first named means for molding the articles from said unformed material to said predetermined shape and size; said pressing plunger assembly comprising a pressing plunger arranged for movement in a predetermined straight path, and having an annular pressing surface substantially in a plane perpendicular to said path, a central portion of said plunger inwardly of said annular surface extending axially of said path beyond said surface and arranged to form a part at least of said first named cavity, a recess extending from the outer end of said central portion of said pressing plunger axially inwardly of said pressing plunger and including (1) a threaded portion, (2) an enlarged portion, and (3) a counterbore, a plunger head of non-yielding material having an axial stem arranged to slide in said counterbore, an annular body of yieldable material surrounding a portion of said stem and disposed between said plunger head and the end of said central portion of said pressing plunger, said yieldable material being adapted to be deformed within its elastic limit on relative movement toward one another of the end of said central portion of said plunger and said plunger head to form said reentrant cavity in an article being molded, a washer secured to said stem and located in said enlarged portion of said recess in the operative position of all the parts of said plunger assembly, a compression spring surrounding said stem and extending between said washer and the inner opposite end of said enlarged portion and arranged to exert its force tending to move said head outwardly in respect to said pressing plunger so as to augment the potential energy of the compressed yieldable material at the completion of a forming operation and assist in stripping such yieldable material from a formed article, and an annular member freely mounted on said stem between said washer and said plunger head and outwardly threaded for engagement with said threaded portion of said recess for holding all the parts of said plunger assembly in their assembled relation to one another.

HENRY L. CROWLEY.
ARTHUR M. HOSSENLOPP.

REFERENCES CITED

The following references are of record in the file of this patent:

UNITED STATES PATENTS

| Number | Name | Date |
| --- | --- | --- |
| 601,825 | Conners | Apr. 5, 1898 |
| 1,504,547 | Egerton | Aug. 12, 1924 |
| 1,879,663 | Dreyer | Sept. 27, 1932 |
| 1,934,292 | Barker | Nov. 7, 1933 |
| 2,132,002 | Hight | Oct. 4, 1938 |
| 2,307,114 | Dichter | Jan. 5, 1943 |
| 2,360,528 | Talmage | Oct. 17, 1944 |